(12) United States Patent
Ortiz et al.

(10) Patent No.: US 11,940,088 B2
(45) Date of Patent: Mar. 26, 2024

(54) UNIVERSAL HARDWARE MOUNT

(71) Applicant: Rahi Systems Inc., Fremont, CA (US)

(72) Inventors: Jovan Ortiz, Morgan Hill, CA (US); Kyle Prescott, San Jose, CA (US)

(73) Assignee: Rahi Systems Inc., Fremont, CA (US)

( * ) Notice: Subject to any disclaimer, the term of this patent is extended or adjusted under 35 U.S.C. 154(b) by 29 days.

(21) Appl. No.: 17/407,859

(22) Filed: Aug. 20, 2021

(65) Prior Publication Data

US 2023/0055167 A1    Feb. 23, 2023

(51) Int. Cl.
*F16M 13/02* (2006.01)
*F16M 11/04* (2006.01)
*H02G 3/10* (2006.01)

(52) U.S. Cl.
CPC .......... *F16M 13/02* (2013.01); *F16M 11/045* (2013.01); *H02G 3/10* (2013.01)

(58) Field of Classification Search
CPC ........ F16M 13/02; F16M 11/045; H02G 3/10; A47F 5/0838; A47F 5/0846; A47F 5/0853; A47B 61/02; A47B 95/008
USPC .............. 248/298.1, 220.21, 220.22, 223.41, 248/224.51, 235, 244, 247, 250, 682, 686; 211/94.01
See application file for complete search history.

(56) References Cited

U.S. PATENT DOCUMENTS

| | | | | |
|---|---|---|---|---|
| 5,582,116 A * | 12/1996 | Spimpolo | .............. | A47B 96/00 211/94.01 |
| 8,282,058 B2 * | 10/2012 | Lundrigan | .............. | A47B 47/02 248/220.42 |
| 8,844,180 B2 * | 9/2014 | Kludt | ....................... | H05K 5/06 248/223.41 |
| 9,644,787 B2 * | 5/2017 | McArdle | ................ | F16M 13/02 |
| 10,619,787 B1 * | 4/2020 | Kho | ........................ | H04N 5/655 |
| 2007/0046837 A1 * | 3/2007 | Elberbaum | ............ | F16M 13/02 348/739 |
| 2011/0260026 A1 * | 10/2011 | Ye | ........................... | F16M 11/04 248/298.1 |
| 2013/0180202 A1 * | 7/2013 | Woods | ................. | A47B 95/008 52/710 |
| 2016/0134733 A1 * | 5/2016 | Murphy | .................... | A45F 5/00 455/575.6 |
| 2016/0186925 A1 * | 6/2016 | Bettin | ................... | F16M 13/022 248/223.41 |
| 2018/0352956 A1 * | 12/2018 | Gebril | .................. | A47B 97/001 |
| 2020/0347585 A1 * | 11/2020 | Kim | ....................... | H04L 12/2803 |
| 2021/0137267 A1 * | 5/2021 | Schofield | ............. | A47B 81/005 |
| 2021/0378146 A1 * | 12/2021 | Hatol | ................. | H05K 7/20563 |

OTHER PUBLICATIONS

Proximity Component Storage Slide-Lock Panel, retrieved on Nov. 12, 2021, https://www.legrandav.com/products/chief/accessories/display/cpu_accessories/csslp15x10/csslp15x10.

* cited by examiner

*Primary Examiner* — Alfred J Wujciak (74) *Attorney, Agent, or Firm* — United IP Counselors, LLC (57) ABSTRACT

An extendable hardware mount is disclosed. The mount includes a bracket and a rail system allowing the bracket to move between an extended position and a contracted position. The bracket may be detachable from the rail system. The bracket may include a securement system providing at least one securement location for equipment.

11 Claims, 11 Drawing Sheets

UNIVERSAL HARDWARE MOUNT

TECHNICAL FIELD

The invention relates to a mounting bracket for equipment.

BACKGROUND

In some settings a computer monitor or other display is mounted on a vertical surface, such as a wall. Often a computer or other equipment connected to the display sits at a distance from the wall. Cables connecting the equipment with a power source and with the display may become a tripping hazard and may be aesthetically unpleasing. The cables may also become entangled, rendering equipment maintenance and replacement difficult.

Mounting the equipment to the wall may prove difficult. The equipment may not be configured for directly mounting to a wall, requiring specialized gear to support the equipment on the wall. Multiple people may be required to install the gear and mount the equipment.

To avoid a cluttered appearance, the wall-mounted equipment may be installed behind a display. However, this risks the equipment being hit by the display or mounts for the display. Additionally, access to the equipment is limited by the display, rendering service and maintenance of the equipment cumbersome. Often the display must be removed from the wall for wall-mounted equipment to be serviced and then re-mounted on the wall.

BRIEF SUMMARY

One aspect of the invention is to provide a hardware mount for a computer and/or other equipment. The mount includes a bracket connected to a rail system allowing the bracket to move between an extended position and a contracted position. The bracket may be replaceably detachable from the rail system.

In another aspect of the invention, the bracket includes a securement system providing securement locations for the equipment. The securement locations may be formed by one or more slots or openings in the bracket. The slots or openings may be provided in pattern on the bracket.

In a further aspect of the invention, the bracket may be a shallow enclosure with a perimeter wall that at least partially defines an interior of the bracket. The wall may include one or more windows allowing access to the interior of the bracket. A removable cover may close a respective window. The windows may allow access to or act as a support for equipment, accessories, or a variety of modules.

In one aspect of the invention, the bracket may be mounted on a surface supporting a display. The mounted bracket is movable along the surface between the contracted position, where the bracket is obscured behind the display, and the extended position, where the bracket extends out from behind the display.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

As used in this application, the term "equipment" has a broad meaning, encompassing any electronic or non-electronic device, as well as any associated cables or accessories thereof.

Figure 1:
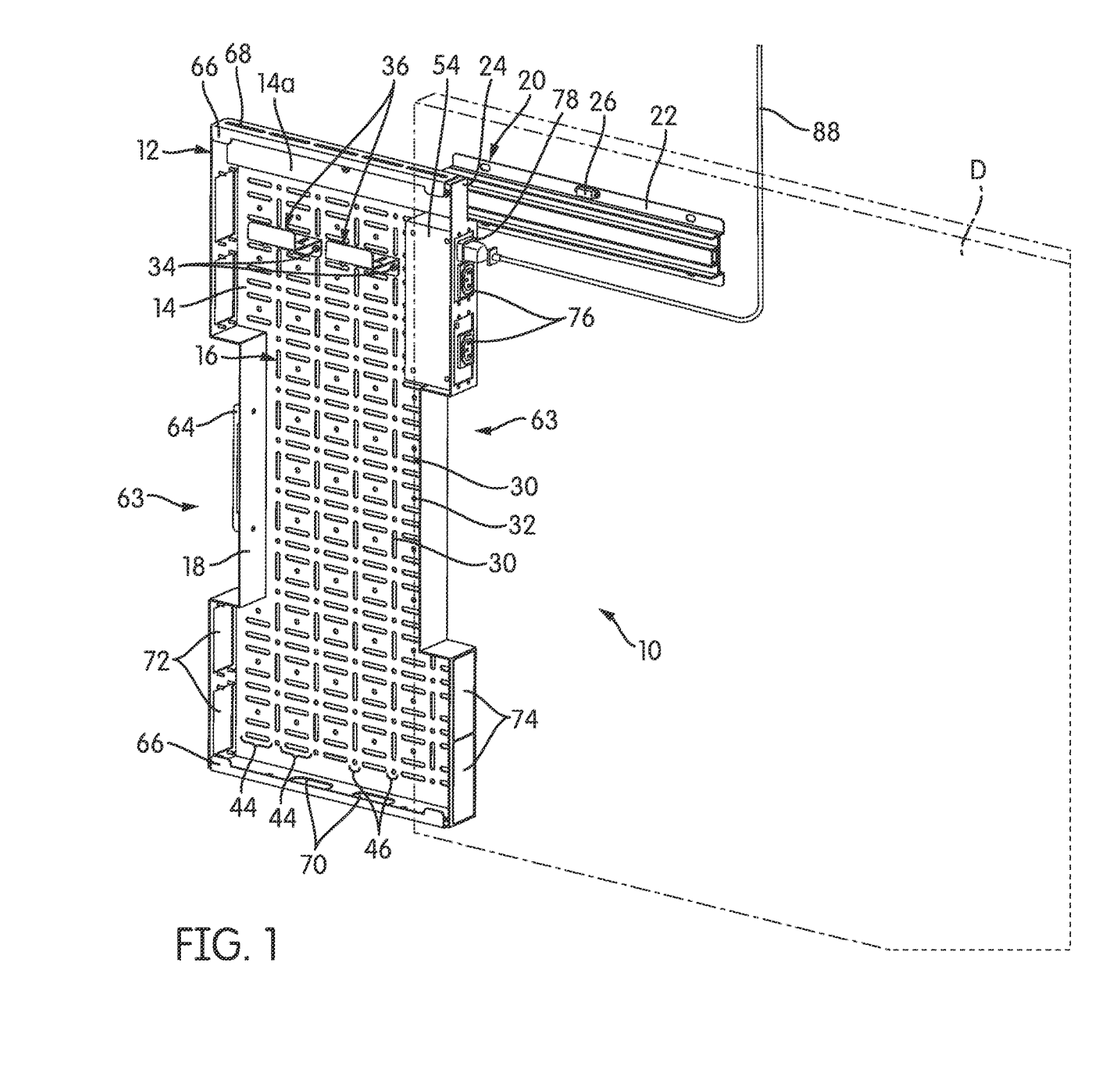
FIG. 1 is a perspective view of a hardware mount in an extended configuration, according to one embodiment of the invention.
Figure 2:
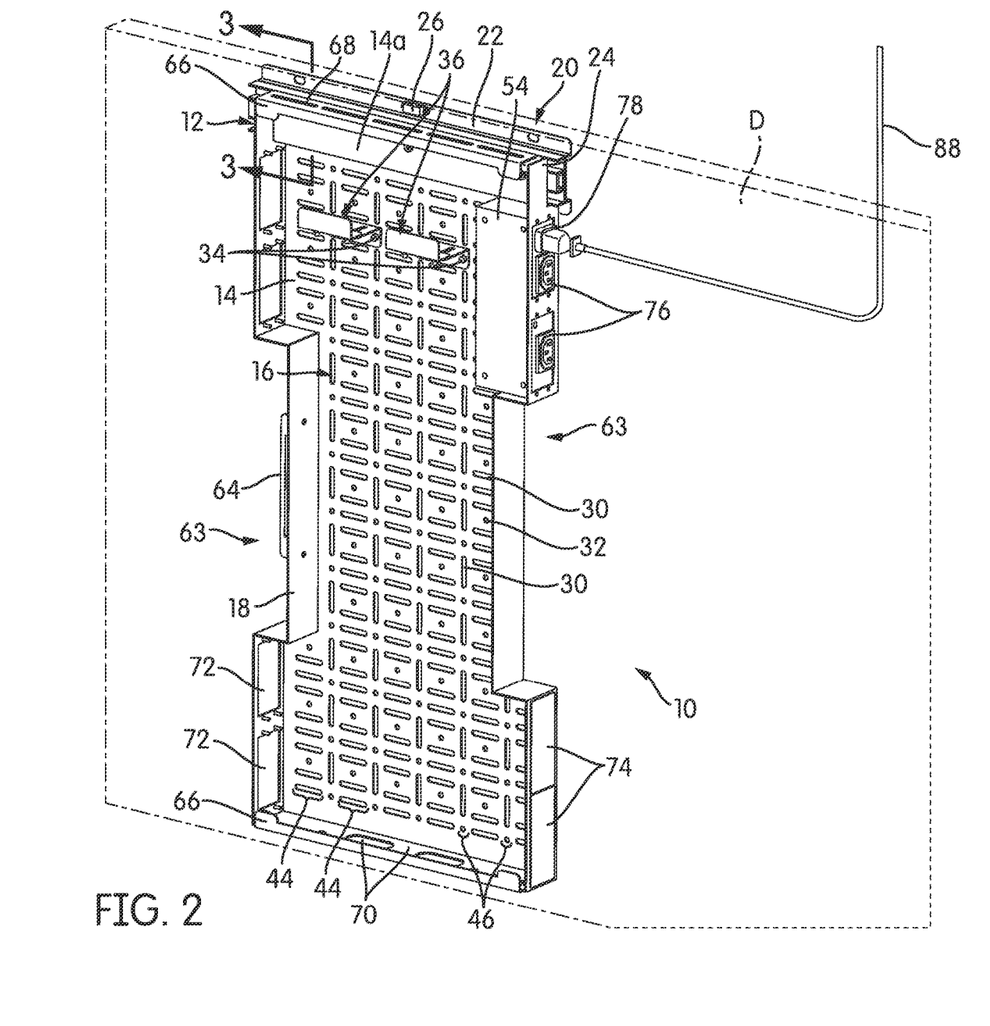
FIG. 2 is a perspective view of the hardware mount of FIG. 1 in a contracted configuration.

FIGS. 1 and 2 are perspective views of a hardware mount, generally indicated at 10, according to one embodiment of the invention. The hardware mount 10 is adapted for installation on a surface, such as a wall supporting a display D, shown in phantom in FIGS. 1 and 2. In some situations, a space is present between the wall and the display D due to wall-mounting equipment supporting the display D on the wall. The hardware mount 10 is adapted to be installed on the wall in this space behind the display D.

The mount has a bracket 12 adapted to support a variety of equipment. The bracket 12 includes a base 14 with a securement system 16, described in further detail below. A wall 18 extends along the perimeter of the base 14. Thus, the bracket 12 forms a shallow enclosure with the wall 18 and the base 14 enclosing an interior of the bracket 12.

The shallow depth of the bracket 12 allows the hardware mount 10 to have a low profile when installed on a wall. This low profile helps equipment to fit behind the display D. Thus, the hardware mount 10 and the display D may be installed closer to the wall and project a smaller distance from the wall. Having the hardware mount 10 projecting a minimal distance from the wall may facilitate conformity with safety and other regulatory requirements for wall-mounted equipment.

In some applications, the wall 18 may be configured to prevent equipment supported by the bracket 12 from contacting items located outside of the bracket 12, such as the display D, mounting equipment for the display D, or other objects near the bracket 12.

To allow movement of the bracket 12 relative to the display D, a portion of the bracket 12 is configured to interface with a rail system 20. The rail system 20 includes a track 22 and a slide 24 adapted to move along the track 22. In the coordinate system of FIG. 1, the slide 24 is incorporated into an upper portion of the bracket 12 to allow the bracket 12 to move along the track 22. In some embodiments, the base 14 may include a recessed portion 14a adapted to house the slide 24, as discussed in more detail below.

The rail system 20 allows the mount bracket 12 to move in one direction between an extended position, shown in FIG. 1, and a contracted position, shown in FIG. 2. In the coordinate system of FIG. 1, the bracket 12 moves horizontally to the left to reach the extended position. However, in another embodiment, the relative orientation of track 22 and slide 24 may be rotated by 180 degrees to allow the bracket 12 to move horizontally to the right to reach the extended position. In some applications, the rail system 20 and the bracket 12 may be oriented for movement in a direction other than the horizontal, left-right direction. A level 26 may be provided on the track 22 to assist the mounting thereof to a vertical surface, such as a wall.

Figure 3:
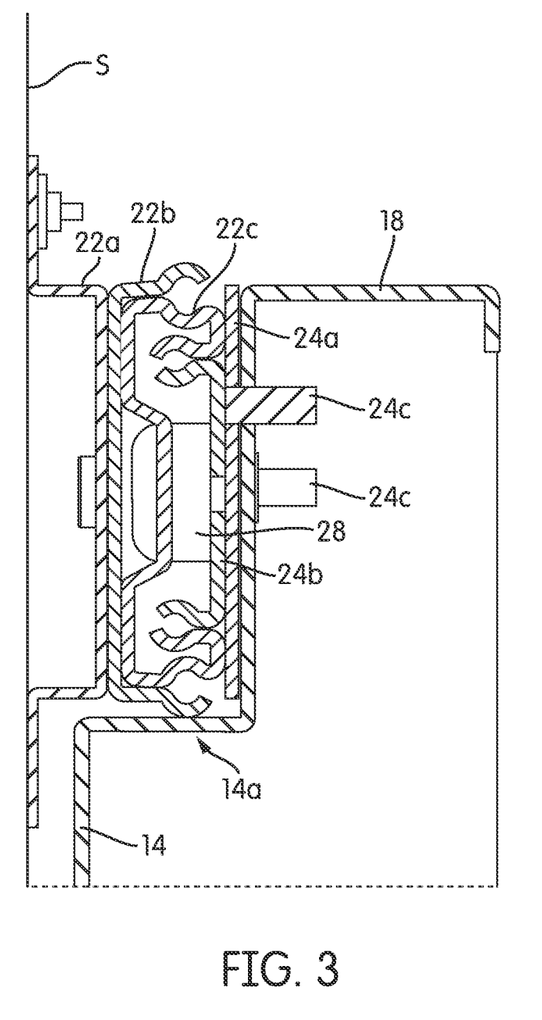
FIG. 3 is a partial cross-sectional view of the hardware mount of FIG. 1 taken through line 3-3 of FIG. 2.

FIG. 3 is a partial cross-sectional view of the hardware mount 10, taken through line 3-3 of FIG. 2, illustrating an exemplary rail system 20. In the illustrated embodiment, the track 22 includes a base plate 22a, an outer track 22b, and an inner track 22c. The outer track 22b is fixed to the base plate 22a. The inner track 22c is engaged with the outer track 22b. In some embodiments, the inner track 22c may slide relative to the outer track 22b. The base plate 22a may be installed on a surface S by one or more fasteners, such as screws, bolt, or other suitable means.

The slide 24 includes an interface plate 24a attached to a slider 24b. The slider 24b is fixed to the interface plate 24a and slidably engageable with the inner track 22c. In some embodiments, the slider 24b may be fixed directly to the bracket 12.

As can be seen in FIG. 3, the interface plate 24a is attached to the bracket by one or more suitable fasteners 24c. Multiple fasteners 24c may be positioned at different locations along the interface plate 24a to secure the bracket to the slide 24.

In the illustrated embodiment, the fasteners 24c may be a threaded post secured to the interface plate 24a, such as by welding or other means. The fastener 24c is adapted to extend through an opening in the recessed portion 14a and receive a fastening element, such as a thumb screw, thumb nut, wing nut, machine screw nut or the like, to hold the bracket 12 to the slide 24. The bracket 12 may be detached from the slide 24 by disconnecting the fastening element from the fastener 24c and removing the bracket 12 from the fasteners 24c. This allows the bracket 12 to be removable from the rail system 20, discussed in further detail below.

In some embodiments, the slider 24b may be detachably engaged with the inner track 22c. This also allows the bracket 12 to be removed from the rail system 20.

Of course, a person having ordinary skill in the art would understand that other fasteners, such as a rivet, screw, bolt, or the like, may be implemented to secure the bracket 12 to the slide 24.

In the illustrated embodiment, the recessed portion 14a is sized and shaped to house or cover most or all of the outer track 22b, the inner track 22c, the interface plate 24a, and the slider 24b at least when the hardware mount 10 is in the contracted position. Thus, the bracket 12 may have a lower profile along the surface S.

In the illustrated embodiment, the slider 24b slides relative to the inner track 22c so that the bracket 12 may move between the extended and contracted positions. In some embodiments, the inner track 22c may slide relative to the outer track 22b. In other embodiments, the inner track 22c may slide relative to the outer track 22b and the slider 24b may slide relative to the inner track 22c, thus allowing the bracket 12 to extend a greater distance away from the track 22 in the extended position.

In some embodiments, any of the outer track 22b, inner track 22c, and the slider 24b may include a stopper 28 adapted to limit relative movement among those components, thus limiting the distance the bracket 12 may extend away from the track 22. In other embodiments, the track 22 and slide 24 may have a different configuration so long as the slide 24 may move relative to the track 22 between contracted and extended positions.

Movement between the contracted and extended positions facilitates access to the bracket 12 and equipment carried by the bracket 12. In some applications, the hardware mount 10 may be installed behind the display D such that, in the contracted position, the hardware mount 10 is obscured behind the display, as can be seen in FIG. 2. Put another way, the hardware mount 10 is substantially hidden by the display in the contracted position. As can be seen in FIG. 1, the bracket 12 may be moved along the track 22 out from behind the display to the extended position to expose any equipment on the bracket 12. The exposed equipment may be easily inspected and serviced without having to move the display.

In some embodiments, the bracket 12 may include one or more accessories to facilitate movement along a surface. The accessory may also protect the bracket 12 and the surface from damage during movement of the bracket 12. For example, felt material may be adhered to the rear of the bracket 12 for contacting the surface.

In some applications, the bracket 12 is detachable form the rail system 20. For example, ss described above, the bracket 12 may be detachable from the slide 24 and/or the slide 24 may be detachable from the track 22. Equipment may be more easily secured to the bracket 12 when it is detached from the track 22. The bracket 12 or equipment carried by the bracket 12 may also be more easily inspected or serviced away from the surface on which the hardware mount 10 is installed. In some situations, a different bracket 12 with other equipment may be installed on the track 22 to replace the detached bracket 12.

The ability to detach the bracket 12 easily from the rail system 20 has specific advantages during an installation or build-out, especially one in which multiple brackets 12 are to be installed. In these scenarios, the tracks 22 may be installed in appropriate locations on a wall or other vertical surface. These "appropriate locations" would usually be locations at which a display D is to be mounted. The brackets 12 would be detached and equipment installed in them separately. Once the equipment is installed in the bracket 12, the bracket would be connected to the rail system 20. This means that an installer would have the relative luxury of placing the bracket flat on a workbench or desk with its open interior facing up and resting the equipment in it, rather than trying to work with the bracket 12 installed vertically on a wall. As those of skill in the art will realize, although installing and removing equipment from the bracket 12 is perfectly possible while it is attached to the vertical surface and will often be done to configure, maintain, or replace equipment once a bracket 12 is installed, there is a disadvantage to working in that orientation: a piece of equipment could fall out of the bracket 12 while one is trying to secure it, potentially causing damage. Especially for large-scale installations, working with the bracket 12 detached and supported by a horizontal surface is much more efficient.

In some situations, the installation of the rail system 20 and the installation of equipment in the bracket 12 may be done completely separately. While installers are sent to a location with a box full of tracks 22 and slides 24 to be installed where needed, equipment is installed in a corresponding number of brackets 12 in a production-type assembly facility. Once the brackets 12 are properly configured, they are shipped or brought to the installation site for mating with the installed rail systems 20. Again, this is particularly advantageous for high-volume situations, such as the "build out" of a new office building in which multiple brackets 12 of this type are installed.

As mentioned above, the bracket 12 includes a securement system 16 that facilitates securing equipment to the bracket 12. The securement system 16 provides a plurality of securement locations where equipment may be mounted to the bracket 12. Thus, a variety of equipment having different dimensions, shapes, and/or orientations may be secured to the bracket 12 in an organized manner.

Figure 4:
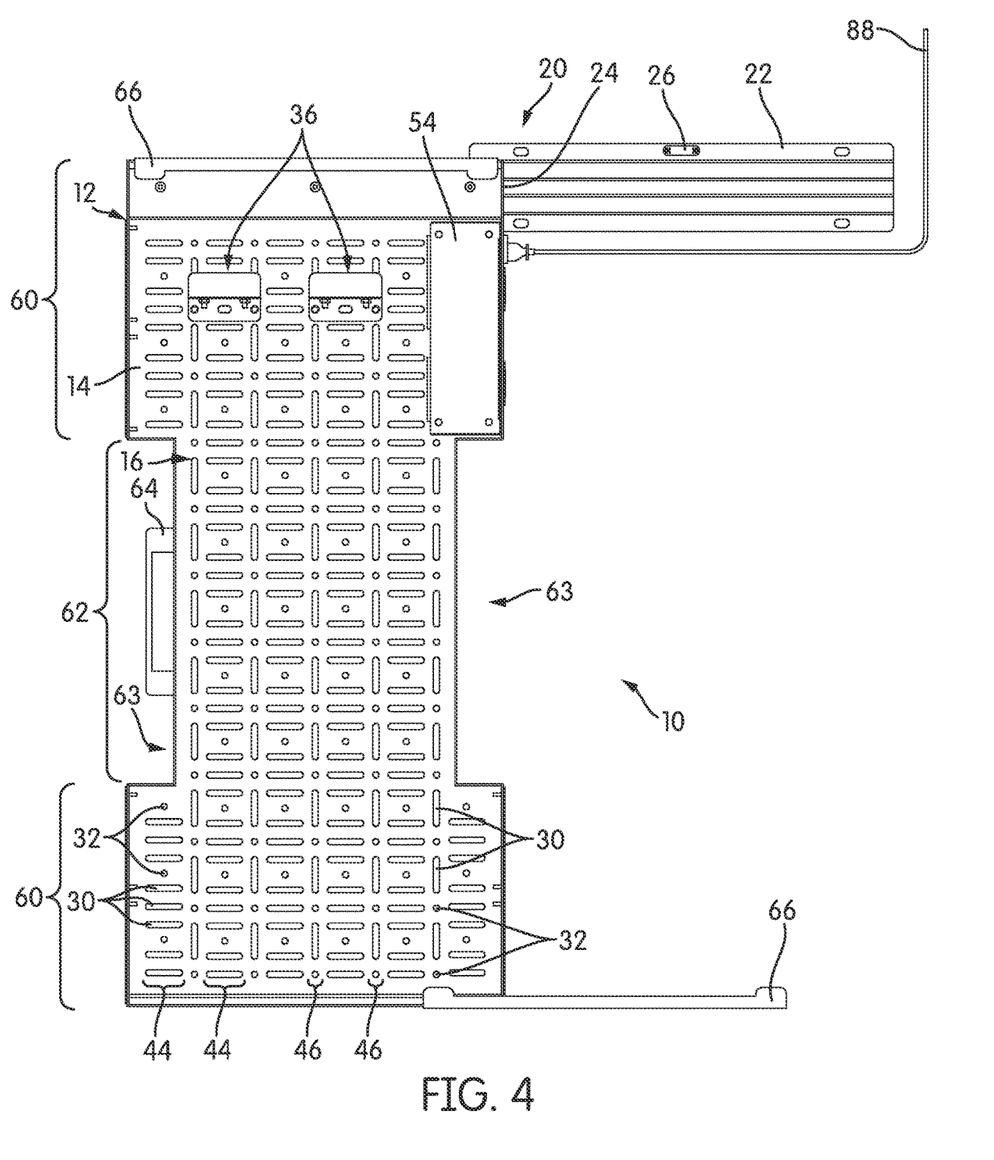
FIG. 4 is a front elevational view of the hardware mount of FIG. 1.

FIG. 4 is a front elevational view of the hardware mount 10. In the illustrated embodiment, the securement locations are formed as a pattern of slots 30 and openings 32 in the base 14. The slots 30 have an elongate shape and are sized to accommodate fastening means for equipment. In other embodiments the slots 30 may have a different shape, size, and/or orientation. In some applications, the slots 30 are configured to accommodate zip-ties, hook-and-loop fasteners, straps, bolts, or other means that would secure a piece of equipment to the bracket 12.

The openings 32 are sized and shaped to accept a fastener 34, as can be seen in FIG. 1. The fasteners 34 may have any suitable form, such as a screw, rivet, clip, or the like. The openings 32 may be configured to accept fasteners or other structures from equipment to directly secure the equipment to the bracket 12.

Figure 5:
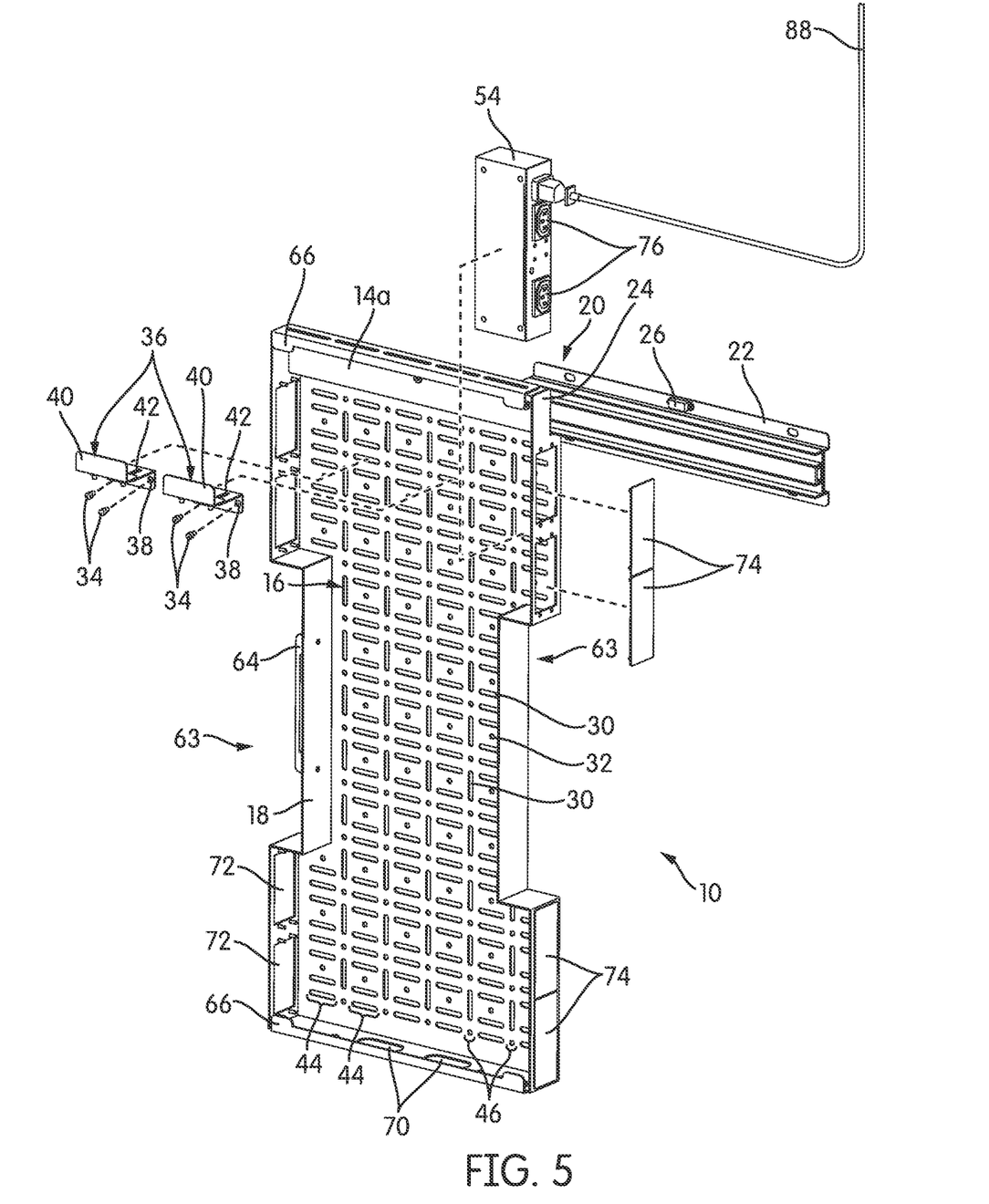
FIG. 5 is an exploded perspective view of the hardware mount of FIG. 1.

FIG. 5 is an exploded perspective view of the hardware mount 10. The openings 32 may also be configured to secure a clamp 36 to the bracket 12. The clamp 36 includes mounting holes 38 spaced apart by the same distance as a distance between openings 32. Thus, fasteners 34 may extend through mounting holes 38 aligned with the openings 32 to secure the clamp 36.

Figure 6:
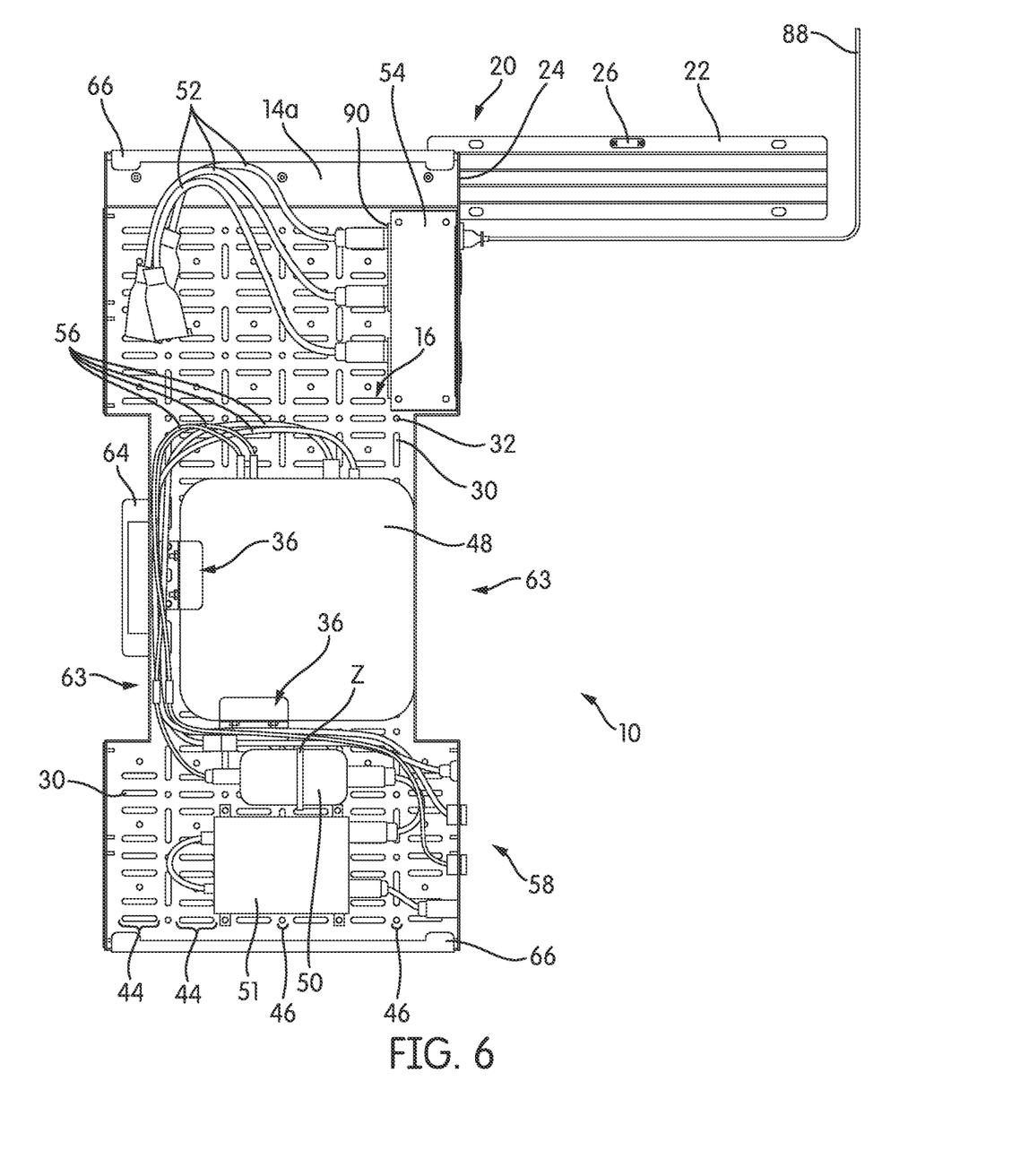
FIG. 6 is a front elevational view of the hardware mount of FIG. 1 with equipment secured to the hardware mount.

As can be seen in FIG. 4, the clamp 36 may extend horizontally between two openings 32. In some applications, the clamp 36 may extend in other orientations defined between sequential openings 32, such as a vertical orientation as shown in FIG. 6 and discussed in further detail below.

In some applications, the clamp 36 may be adjustable in a direction extending away from the base 14. As can be seen in FIG. 5, the clamp 36 includes a sliding cap 40 that is movable along slits 42. The position of the cap 40 along the slits 42 may be fixed by suitable means, such as a thumb screw, wing nut and bolt, or the like. Thus, the cap 40 may be positioned relative to the base 14 and the clamp 36 may be adjusted to accommodate equipment of different dimensions and secure equipment to the bracket 12.

In the illustrated embodiment, the slots 30 and openings 32 are spaced at regular intervals along the vertical and horizontal dimensions of the bracket 12 to form a pattern. Referring to FIG. 4, the securement system 16 may include a first column 44 and a second column 46 that are repeated to form a pattern. The first column 44 includes groups of at least one horizontally oriented slot 30 separated by at least one opening 32. The second column 46 includes an alternating pattern of vertically oriented slots 30 and openings 32. The securement system 16 may repeat the first column 44 and second column 46 in a regular pattern. Thus, the securement system 16 shown in FIG. 4 provides a plurality of securement locations for equipment to be secured in a variety of positions and orientations on the bracket 12.

In other embodiments, the slots 30 and openings 32 may be provided in different configurations. For example, the slots 30 and openings 32 may be provided in a pattern different from that shown in FIG. 4. In other embodiments, the slots 30 and openings 32 may be positioned at irregular intervals without a pattern.

The securement system 16 of the illustrated embodiment has certain advantages. One of those advantages is that it can accommodate components of different sizes, shapes, and configurations. The plethora of slots 30 and openings 32 provides a wide variety of different mounting positions and allows differently-sized components to be placed in appropriate locations within the bracket 12. As was mentioned above, the slots 30 and openings 32 allow a wide variety of different types of mounting structures to be used, ranging from simple zip-ties and straps to clips, screws, and clamps 36. This allows an installer to use whatever sort of fastener is convenient, and to tailor the fastener to the equipment that is being mounted. For example, if a piece of equipment is likely to be removed often for maintenance, upgrades, or other purposes, that piece of equipment can be secured with something, like a strap, that can be quickly secured and just as quickly loosened to permit removal. Moreover, different pieces of equipment within the bracket 12 may be secured by different types of mounting structures, depending on factors like the weight of the item, the fragility of the item, and the likelihood that it will need to be removed often.

Of course, not every bracket need have such a versatile securement system 16. For example, if a bracket is made to hold known, specific components in specific locations, its securement system may provide only certain specific, pre-planned mounting locations with component-specific mounting structure provided at each location. Yet even in situations in which all of the components installed in a bracket 12 are known and pre-planned, an adaptable securement system 16 still has an advantage: it allows for easy reconfiguration later. Computing and audiovisual equipment is often upgraded at relatively short intervals, and a bracket 12 that is reconfigurable will usually have a longer useful service life.

FIG. 6 is a front elevational view of the hardware mount 10 with exemplary equipment secured to the bracket 12. In the illustrated embodiment, the equipment includes a computer 48 and pieces of audiovisual equipment 50, 51. As can be seen in FIG. 6, one clamp 36 is horizontally oriented while another clamp 36 is vertically oriented to secure the computer 48 to the bracket 12. A first piece of audiovisual equipment 50, such as a USB Capture HDMI device, is secured to the bracket 12 by a zip-tie Z wrapped through multiple slots 30. A second piece of audiovisual equipment 51, such as an HDMI Receiver device, is secured to the racket 12 by fasteners extending through slots 30 and openings 32 of the securement system 16. One or more power cables 52 may connect the equipment with a power distribution unit (PDU) 54, described in more detail below. Other suitable cables 56 may interconnect the computer 48 and the audiovisual equipment 50 with each other and with one or more connector modules 58 attached to the bracket 12, described in more detail below. In some applications, the cables 52, 56 may be secured to the securement system 16, such as by straps, zip-ties, or other suitable means. Of course, the computer 48 and audiovisual equipment 50, 51 described above are merely exemplary. Other pieces of equipment may be secured to the bracket 12 instead of or in addition to the computer 48 and the audiovisual equipment 50, 51 anywhere along the securement system 16.

In the embodiment shown in FIGS. 1-6, the bracket 12 is generally hourglass shaped with two wide portions 60 connected by a narrow portion 62. In some embodiments, a handle 64 may be provided in the narrow portion 62. A user may grip the handle 64 to move the bracket 12 between the extended and contracted positions. As can be seen in FIG. 4, the handle 64 may be conveniently positioned on the wall 18 opposite from the track 22, in the extended position. The hourglass shape may provide additional space in the wide portions 60 for equipment and cables. In other embodiments, the bracket 12 may have a different shape.

The wall 18 follows the shape of the base 14 along the perimeter thereof. Thus, in the illustrated embodiment, the wall 18 assumes the hourglass shape of the base 14 and defines spaces 63 adjacent the narrow portion 62. The handle 64 may be supported by the wall 18 in the space 63 so as to not extend beyond a wide portion 60 of the bracket.

The spaces 63 may be adapted to accommodate or provide clearance for other structures mounted near the bracket 12, such as wall-mounting equipment for the display D. For example, when the bracket 12 assumes a contracted position, such as shown in FIG. 2, the wall-mounting equipment for the display D may extend into the space 63. Thus, the bracket 12 may be positioned further behind the display D without contacting or interfering with the wall-mounting equipment. Of course, a person having ordinary skill would understand that the spaces 63 may provide clearance for other structures as well.

In some embodiments, the bracket 12 may support at least one cable arm 66 on the wall 18. The cable arms 66 may provide supporting structure for cables or other accessories. The cable arm 66 may completely overlap with the wall 18 in a contracted position, as shown in FIG. 1. As can be seen in FIG. 4, the bottom cable arm 66 may be extended from the wall 18 to an extended position. In some applications the top cable arm 66 or both of the cable arms 66 may be in an extended position. As can be seen in FIG. 1, the cable arms 66 may include a plurality of slits 68 configured to receive a suitable fastener, such as a screw or the like, that secures the cable arm 66 to the wall 18.

In some applications, the slits 68 may receive zip-ties, hook-and-loop fasteners, straps, bolts, or other means that could secure a cable or other item to the cable arm 66. In some applications, where cables attached to a cable arm 66 with enough slack, the cable arm 66 may move from a contracted position to the extended position to move the cables away from equipment secured to the bracket 12. This may advantageously improve access to the equipment.

As can be seen in FIG. 1, the wall 18 may include at least one aperture 70. The aperture 70 may also allow air flow into and out of the interior of the bracket 12.

Additionally, a plurality of windows 72 are also provided in the wall 18. One or more covers 74 may be provided to close a respective window 72. The covers 74 may be detachably connected to the wall 18 by screws, clips, or other fasteners to close a window 72.

In some embodiments, one or more of the windows 72 may remain uncovered. Uncovered windows 72 may improve air flow around equipment secured to the bracket 12.

The windows 72 may also allow access to the interior of the bracket 12. The windows 72 may be sized and shaped to accommodate cables or other equipment. In some situations, one or more windows 72 may be left uncovered and pass cables or accessories through the window 72. It may be advantageous to install a grommet or other protective structure over the edges of the window 72 to protect whatever passes through the window 72 from damage, such as from rubbing against those edges.

While the bracket 12 serves primarily as a mounting device, in some embodiments, it may have other functions as well. For example, the bracket 12 may be adapted to provide something that is used by a number of the components that are mounted in it. One of the most common needs of equipment that is mounted in the bracket 12 is expected to be power, and the windows 72 and portions of the bracket 12 may be adapted to provide it. As can be seen in FIG. 1, the PDU 54 may be positioned on the bracket 12 such that front sockets 76 and a power input 78 are accessible through the windows 72.

Figure 7:
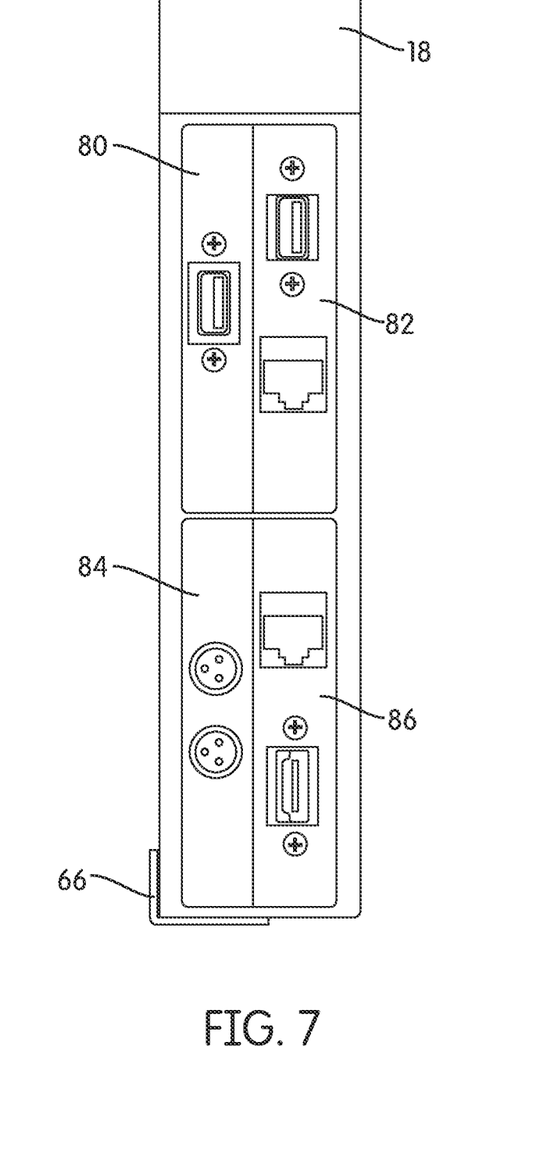
FIG. 7 is a partial side view of the hardware mount of FIG. 1 with connector modules.

As can be seen in FIG. 6, the bracket may also support one or more accessories, such as a connector module 58, at the windows 72. FIG. 7 is a partial side view of the bracket 12 with connector modules. In the illustrated embodiment, a USB connector module 80, a combination USB and RJ-45 connector module 82, a dual XLR audio connector module 84, and a combination RJ-45 and HDMI connector module 86 are secured to the wall 18 at respective windows 72. The connector modules 80, 82, 84, 86 may be attached to the wall 18 by screws, clips, or other fasteners.

Of course, the invention is not limited to the connector modules shown in FIG. 7. Other types modules including at least one of or a combination of audio, video, phone, data, power, and/or control connectors may be secured to the wall 18 for connection with equipment secured to the bracket 12 and other devices. For examples, other connector modules might provide a common network interface, a module with a number of individual HDMI or other display inputs that are switched to a single output, etc.

As briefly described above, the PDU 54 may be secured to the bracket 12 adjacent windows 72. A power cable 88 connects the power input 78 with a suitable power source. In this embodiment, rear sockets 90 of the PDU 54 are oriented toward the interior of the bracket 12 and may easily be connected with and supply power to equipment secured to the bracket 12, such as by an appropriate cable 52. The front sockets 76 may connect with and provide power to equipment outside of the bracket 12, such as one or more displays D.

Figure 8:
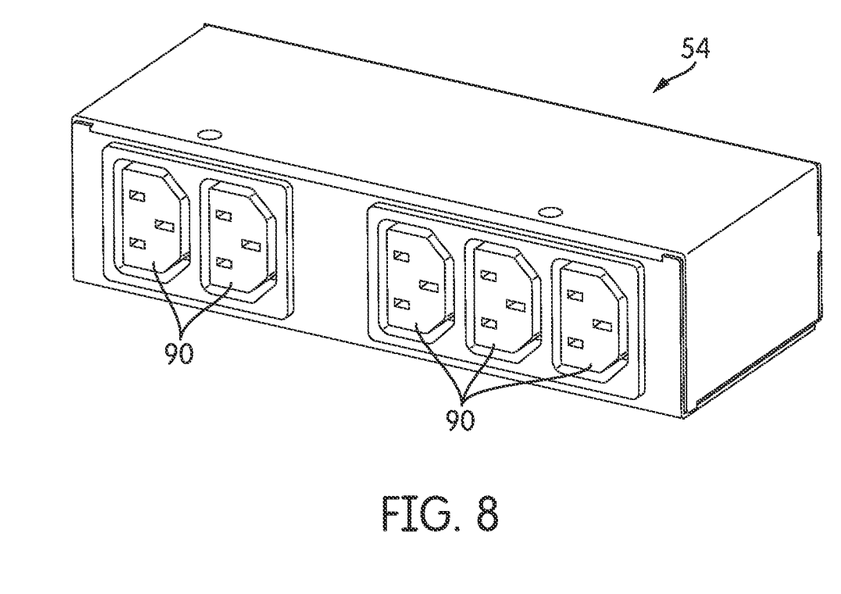
FIG. 8 is a front perspective view of a power distribution unit.
Figure 9:
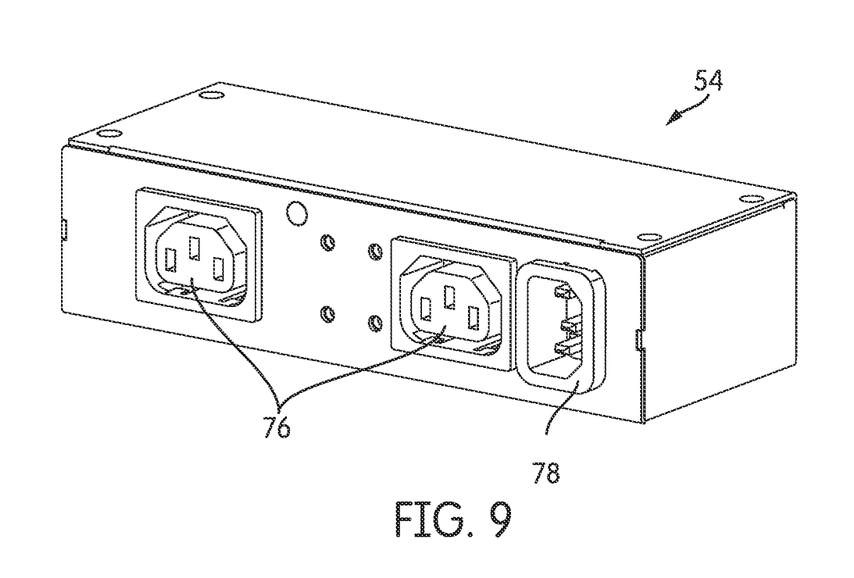
FIG. 9 is a rear perspective view of the power distribution unit of FIG. 8.

FIGS. 8 and 9 are respective rear and front perspective views of the PDU 54 according to an aspect of the invention. As explained above, the PDU 54 may serve as a single source of power for multiple pieces of equipment associated with the bracket 12. The front sockets 76 and the rear sockets 90 function as outputs for the PDU 54. The power input 78 receives power from a source for distribution through the sockets 76, 90.

In the embodiment shown in FIGS. 8 and 9, the front sockets 76 are configured as C13 sockets and the rear sockets 90 are configured as C14 sockets. However, in other embodiments, the sockets 76, 90 may have other socket configurations. In some applications, the sockets 76 and 90 may have the same socket configuration.

PDU 54 may be a high-voltage, alternating current (AC) power module. In some embodiments, a module could be installed that provides low-voltage, direct current (DC) power at an appropriate voltage or voltages. In some applications multiple power modules may be secured to the bracket 12.

As the placement of the PDU 54 illustrates, the bracket 12 provides a combination of designated space into which specific modules can be placed and undesignated space that can be used to secure anything. This configuration may be particularly useful with modules or other components. However, even the space in which the modules, like PDU 54, are attached have the standard pattern of the securement system 16, so that a module like PDU 54 is not the only component that could be placed there.

Figure 10:
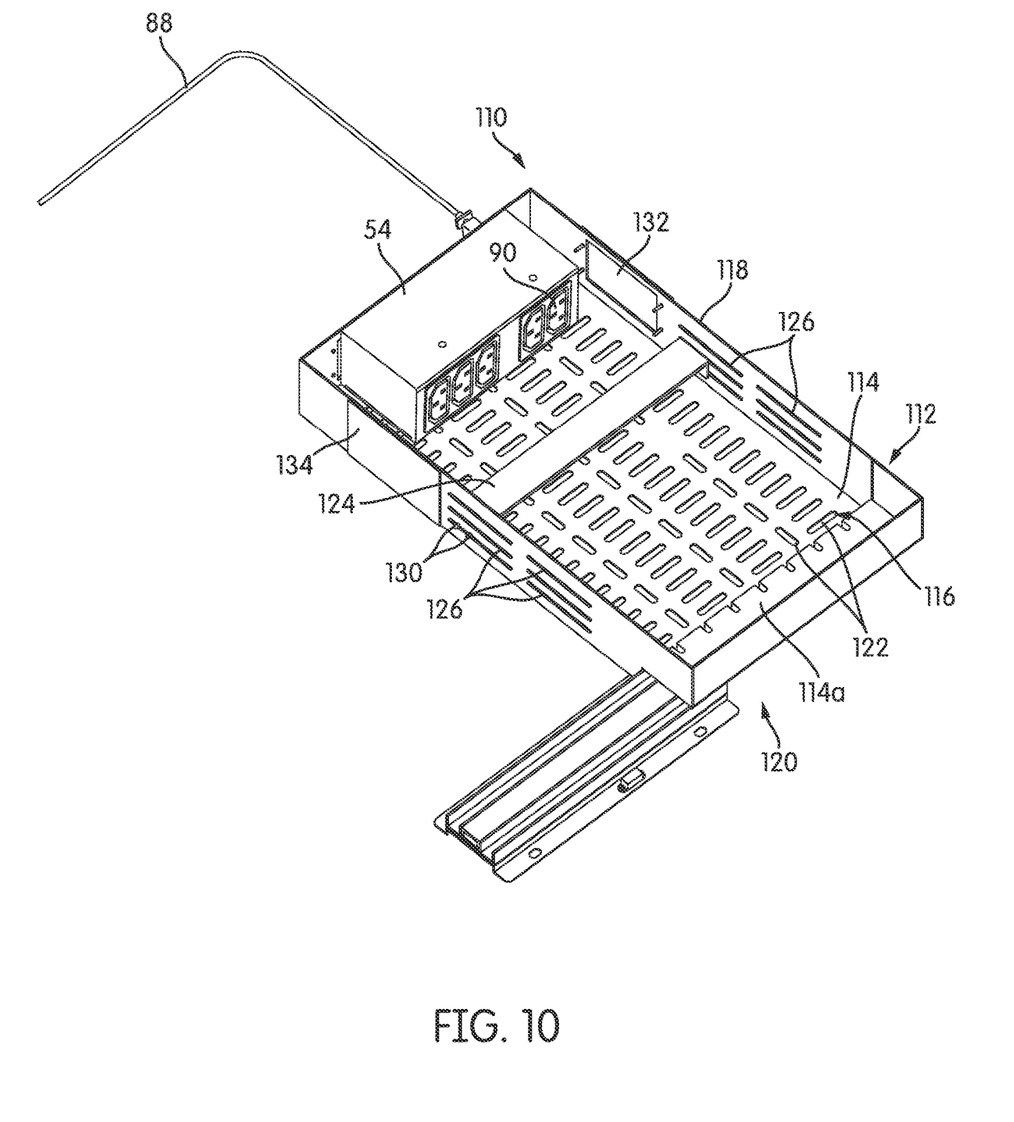
FIG. 10 is a perspective view of a hardware mount according to another embodiment of the invention.
Figure 11:
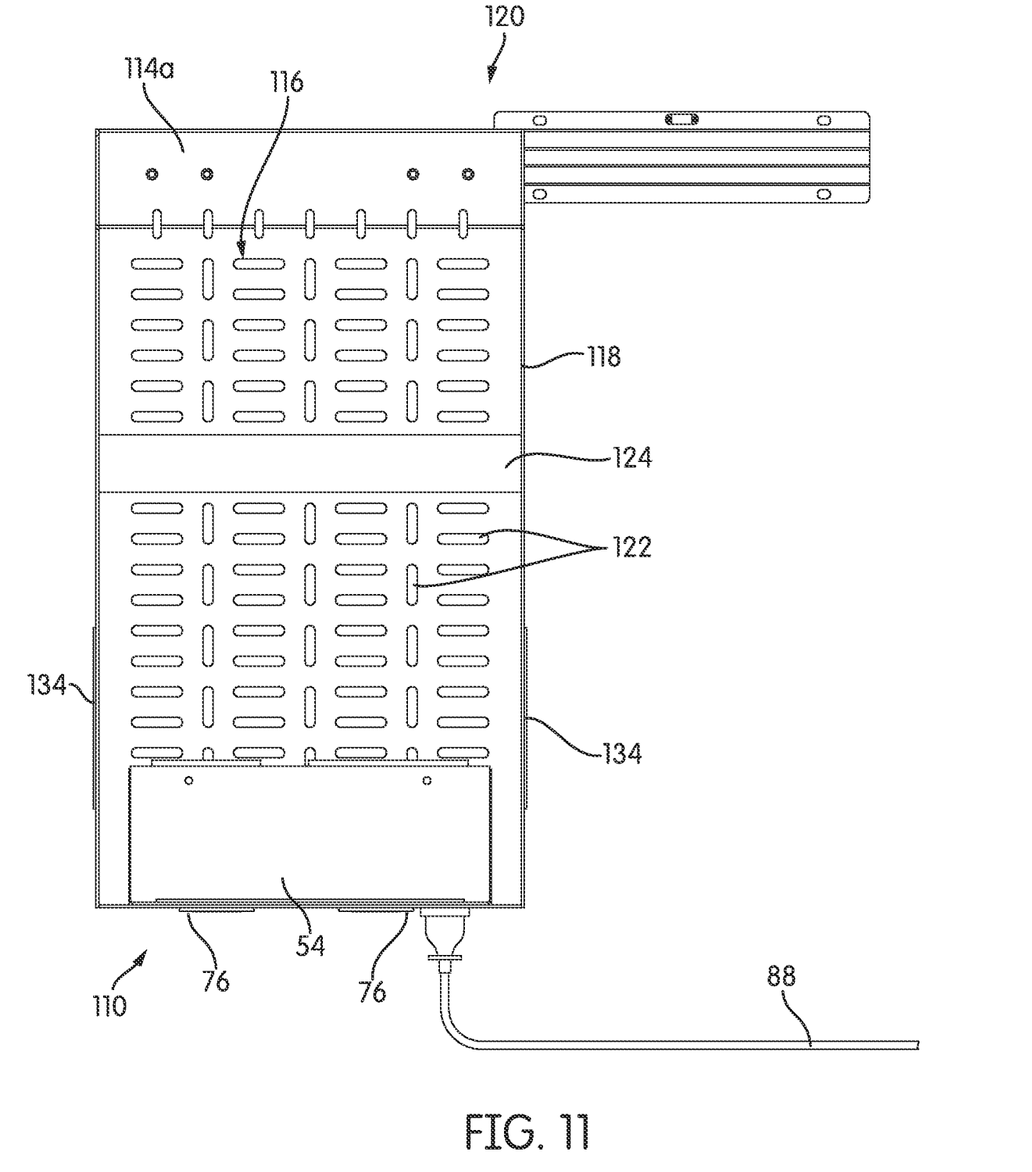
FIG. 11 is a front elevational view of the mount of FIG. 10.
Figure 12:
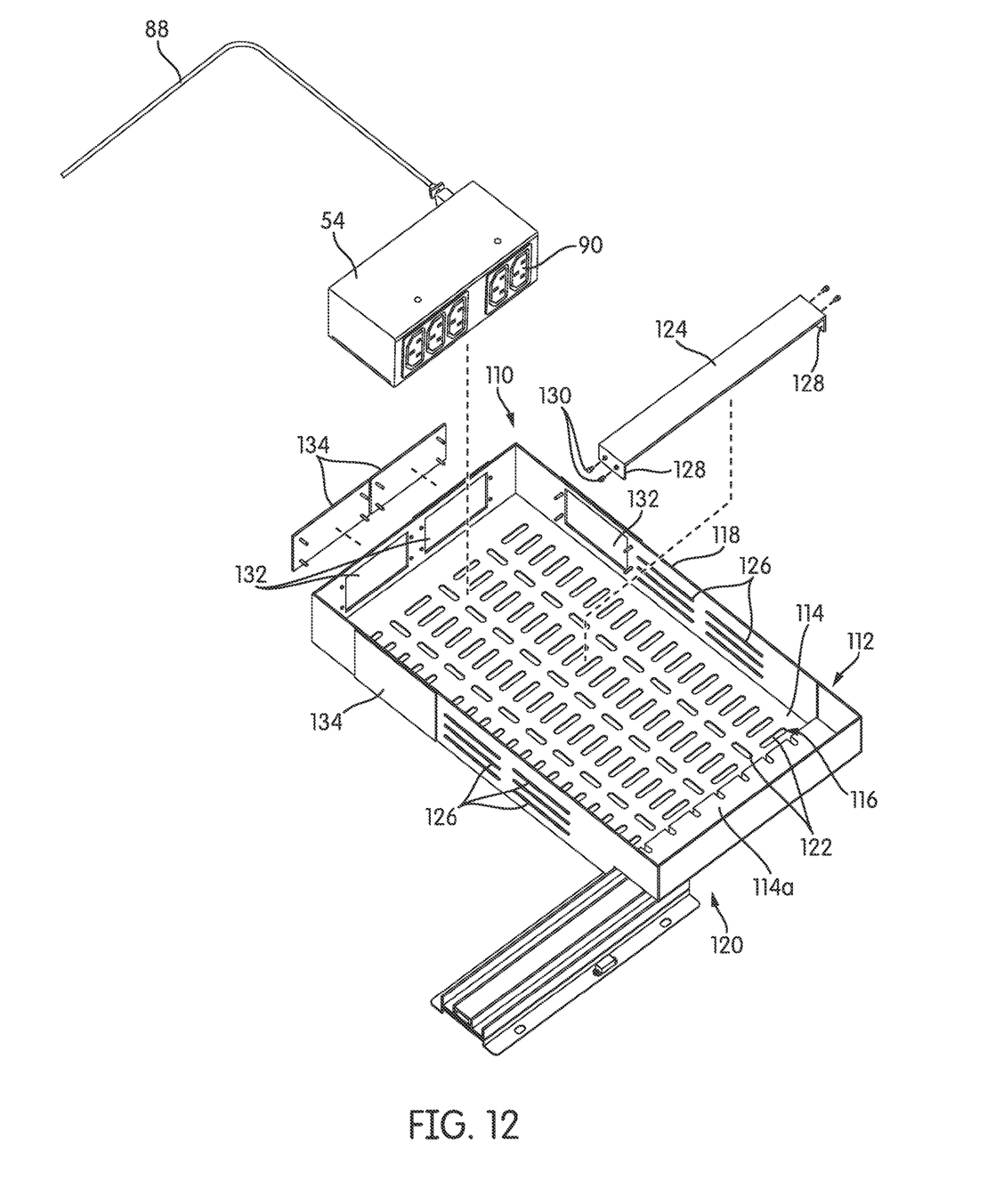
FIG. 12 is an exploded perspective view of the mount of FIG. 10.

FIGS. 10-12 illustrate a hardware mount 110 according to another embodiment. The hardware mount 110 is similar to the hardware mount 10 but has smaller dimensions and has a generally rectangular shape. This configuration may be beneficial in applications where there is less room for or fewer pieces of equipment to be carried by the hardware mount.

The hardware mount 110 includes a bracket 112 having a base 114 with a securement system 116. A wall 118 extends along the perimeter of the base 114 and defines an interior of the bracket 112. The bracket 112 is configured to interface with a rail system 120 to allow movement of the bracket 112 between an extended position and contracted position, in the same manner to the rail system 20 described above. The base 114 may have a recessed portion 114*a* adapted to at least partially house the rail system 120. The rail system 120 is the same as the rail system 20 except for being sized to accommodate the dimensions of the bracket 112.

The securement system 116 provides a plurality of securement locations where equipment may be mounted to the bracket 112. In the illustrated embodiment, the securement system 116 includes a plurality of slots 122 extending through the base 114. The plurality of slots 122 may be oriented in a repeating pattern so that equipment may be secured to the bracket 112 in an organized manner. For example, as can be seen in FIG. 11, the securement system 116 has alternating columns of horizontally oriented slots 122 and columns of vertically oriented slots 122.

In other embodiments, the slots 122 may be provided in other configurations. For example, the slots 122 may be provided at in a pattern different from that shown in FIG. 11. In other further embodiments, the slots 122 may be positioned at irregular intervals without a pattern.

Similar to the slots 30 of the securement system 16 described above, the slots 122 may be adapted to accommodate zip-ties, hook-and-loop fasteners, straps, bolts, or other means to secure equipment to the bracket 112. In some embodiments, the slots 122 may also be configured to secure other components, such as a clamp 36 described above. Thus, the securement system 116 can achieve the same advantages as the securement system 16 described above.

In some applications, the hardware mount 110 may include a brace 124 that may help secure equipment in the bracket 112. The brace 124 is configured to extend substantially entirely across the bracket 112. Thus, equipment may be sandwiched between the brace 124 and the base 114 to securely hold the equipment in the bracket 112.

The brace 124 may be attached to the bracket 112 by any suitable means. For example, the brace 124 may be fastened to the wall 118 of the bracket 112. In the illustrated embodiment, the wall 118 may include slots 126 that may be connected to the brace 124. The brace 124 has a pair of legs 128 adapted to receive one or more fasteners 130, such as a screw, clip, rivet, bolt, etc. Thus, the fastener 130 extends through the slot 126 and into a respective leg 128 to attach the brace 124 to the wall 118.

The slots 126 may also be configured to allow air to flow into and out of the interior of the bracket 112.

The wall 118 also includes one or more windows 132 with removable covers 134. The covers 134 may be detachably connected to the wall 118 by screws, clips, or other fasteners.

The windows 132 are positioned along the wall 118 and adapted to allow access to the interior of the bracket 112 in the same manner as the windows 72 described above. For example, as shown in FIGS. 10-12, a PDU 54 may be secured to the bracket 112 adjacent windows 132 so that a power cable 88 may connect with the power input 78 and the front sockets 76 may connect with and power equipment outside of the bracket 112. In the illustrated embodiment, rear sockets 90 are oriented toward the interior of the bracket 112 and may power equipment secured to the bracket 112. In some applications, other modules or components, such as connector modules 58, may be secured adjacent to a window 122.

In some situations, one or more windows 122 may be left uncovered and pass cables or accessories through the window 122. It may be advantageous to install a grommet or other protective structure over the edges of the window 122 to protect whatever passes through the window 122.

While the invention has been described with respect to certain embodiments, the description is intended to be exemplary, rather than limiting. Modifications and changes may be made within the scope of the invention, which is defined by the appended claims.

What is claimed is:

1. A hardware mount, comprising:
   a bracket comprising a plate-shaped base with a perimeter wall extending from a first side of the plate-shaped base in a first-side direction and extending around the periphery of the plate-shaped base, the plate-shaped base having a securement system for attaching equipment to the plate-shaped base within the bounds of the perimeter wall;
   a rail system to which the bracket is mountable, via a second side of the plate-shaped base that is opposite to the first side of the plate-shaped base, in a manner that permits the bracket to be detached from and attached to the rail system, the rail system adapted to allow movement of the bracket between an extended position and a contracted position; and
   a clamp attached to the securement system, wherein the bracket has an hourglass or dogbone shape comprising a middle portion and a wider portion at each of two ends thereof.

2. The hardware mount of claim 1, wherein the rail system includes a track and the bracket includes a slide assembly attached thereto, the slide assembly adapted to slide along the track.

3. The hardware mount of claim 2, wherein the slide assembly is detachably connectable to the plate-shaped base.

4. The hardware mount of claim 1, wherein the securement system includes a plurality of securement locations for the equipment.

5. The hardware mount of claim 4, wherein the plurality of securement locations are formed as slots and/or openings.

6. The hardware mount of claim 1, wherein the perimeter wall includes at least one window.

7. The hardware mount of claim 6, further comprising a power distribution unit including at least an input and an output, the power distribution unit attached to the securement system so that at least one of the input and the output is aligned with the at least one window.

8. The hardware mount of claim 1, wherein the perimeter wall includes at least one slit.

9. The hardware mount of claim 8, further comprising a brace adapted to connect with the perimeter wall via the at least one slit.

10. The hardware mount of claim 1, further comprising at least one support arm adapted to be extendable from the bracket.

11. The hardware mount of claim 1, wherein the bracket includes a pull handle attached to the middle portion thereof.

* * * * *